United States Patent
Yomogita

[11] Patent Number: 5,899,461
[45] Date of Patent: May 4, 1999

[54] SEALING APPARATUS

[75] Inventor: Michinori Yomogita, Fukushima-ken, Japan

[73] Assignee: NOK Corporation, Tokyo, Japan

[21] Appl. No.: 08/790,897

[22] Filed: Jan. 29, 1997

[30] Foreign Application Priority Data

Jan. 29, 1996 [JP] Japan ................................. 8-034423

[51] Int. Cl.$^6$ .................................................. F16J 15/32
[52] U.S. Cl. .......................... 277/559; 277/560; 277/565
[58] Field of Search ................................... 277/552, 559, 277/549, 560, 562, 565

[56] References Cited

U.S. PATENT DOCUMENTS

| | | | |
|---|---|---|---|
| 2,446,380 | 8/1948 | Meyers et al. . | |
| 3,144,256 | 8/1964 | Wright | 277/208 |
| 3,501,155 | 3/1970 | Dega et al. . | |
| 3,749,464 | 7/1973 | Satterthwaite . | |
| 4,709,930 | 12/1987 | Forch . | |
| 4,858,516 | 8/1989 | Klein | 277/297 R |
| 5,083,802 | 1/1992 | Shimasaki et al. . | |
| 5,172,793 | 12/1992 | Temple et al. | 277/208 |
| 5,244,215 | 9/1993 | Cather, Jr. et al. . | |
| 5,507,505 | 4/1996 | Von-Arndt et al. | 277/208 |
| 5,615,894 | 4/1997 | vom Schemm . | |

FOREIGN PATENT DOCUMENTS 5-31328  8/1993  Japan .

*Primary Examiner*—Anthony Knight
*Assistant Examiner*—John L. Beres
*Attorney, Agent, or Firm*—Jacobson, Price, Holman & Stern, PLLC

[57] ABSTRACT

A sealing device comprising a housing 3 provided with an annular piston insert hole 5, an annular piston member 6 slidably inserted into the piston insert hole 5 of the housing 3, and seal lips 7, 8 provided in inner and outer peripheries of the piston member 6 and placed in slidably sealing contact with inner and outer peripheral surfaces of said piston insert hole 5, in which rugged portions 9, 91 are provided on the sliding surfaces of the seal lips 7, 8.

4 Claims, 3 Drawing Sheets

(FIG. 5(b))
(PRIOR ART)

SEALING APPARATUS

BACKGROUND OF THE INVENTION

The present invention relates to a sealing device used in a piston portion and others for switching and operating a clutch of a speed-change switching apparatus such as an automatic transmission for an automobile, for example.

A conventional sealing device of this kind is provided with a seal lip on inner and outer peripheries of an annular piston member relating to an input of a speed-change switching in an automatic transmission (A/T, CVT, T/F) of an automobile, for example, mainly, a piston which has a function to receive oil pressure to cause it to input and transmit to the clutch.

FIG. 4 is a sectional view of main parts of an automatic transmission using such a conventional sealing device as described above.

In FIG. 4, reference numeral 100 designates a retaining ring having a substantially U-shaped section mounted on a sleeve 101 mounted on a shaft not shown. The portion having a substantially U-shaped section of the retaining ring 100 forms an annular piston insert hole 102. That is, the retaining ring 100 forms a housing having the annular piston insert hole 102.

A piston member 103 which is annular and has a substantially U-shaped section is slidably arranged in the piston insert hole 102, and a multiple-disc clutch 104 is provided on the outer peripheral side at a lower part in the figure of the piston member 103.

A cancel plate 105 mounted on the inner peripheral side of the piston insert hole 102 is provided between the piston member 103 and the multiple-disc clutch 104. The cancel plate 105 is restricted in its axial movement by means of a stopper 106.

A seal lip 112 as a seal member is provided on the outer periphery of the cancel plate 105, and the seal lip 112 is in sealing contact with the inner peripheral surface of a cylindrical portion 103A on the outer peripheral side of the piston member 103.

A plate-like spring 107 as a bias means is provided between the cancel plate 105 and the piston member 103, and the spring 107 biases the piston member 103 in a direction away from the cancel plate 105, that is, upward in the figure.

The piston member 103 comes in contact with a closed surface 102A of the piston insert hole 102 through a rubber-like elastic member 108 and stands still.

A seal lip 109 which slidably comes in sealing contact with the inner and outer peripheral surfaces of the piston insert hole 102 is provided in the inner and outer peripheries of the piston member 103.

In the manner as described, a pressure chamber X and an oil chamber Y are divisibly formed within the piston insert hole 102.

A cylindrical portion on the inner peripheral side having a portion substantially U-shaped section of the retaining ring 100 forming the piston insert hole 102 has a pressure port 110 in communication with the exterior and the pressure chamber X, and a port 111 in communication with the exterior and the oil chamber Y.

In the above-described constitution, working pressure PA exerts on the pressure chamber X through the pressure port 110 of the retaining ring 100. When pressure rises, the piston member 103 moves axially and downward in the figure against the bias force of the spring 107 to push the multiple-disc clutch 104 at the end of the cylindrical portion 103 of the piston member 103, and to transmit power.

On the other hand, oil is supplied to the oil chamber Y through the port 111 of the retaining ring 100 to lower the pressure of the pressure chamber X whereby the piton member 103 is moved axially (upward in the figure) by the bias force of the spring 107, and the end of the cylindrical portion 103A of the piston member 103 is moved away from the multiple-disc clutch 104 to release the transmission of power.

As described above, the piston member 103 is reciprocated axially to turn ON-OFF the multiple-disc clutch 104.

However, in the case of the above-described prior art, the seal lip 109 provided on the inner and outer peripheries of the piston member 103 comprises a mold lip 109A formed from a mold as shown in FIG. 5(a) and a messcut lip 109B formed from a messcut as shown in FIG. 5(b).

Thereby, since the whole sliding surface of the seal lip 109 comes in contact with the inner and outer peripheral surfaces of the piston insert hole 102, friction increases, and the inferior operation of the piston member 103 occurs accordingly.

For this reason, in the above-described prior art, there occurs an inconvenience of the speed change of the automatic transmission (A/T), for example, a great shock during the speed change, and an inferior feeling during the speed change.

Further, the change of a mechanism according to the magnitude of friction has been required.

That is, it is necessary to increase the force of the spring 107 as the bias means for return of the piston member 103. The particulars of the spring 107 need be redesigned.

This results in drawbacks in that the cost increases, and the entire apparatus becomes so large in size that it is not received in a mounting space of the automobile.

SUMMARY OF THE INVENTION

It is an object of the present invention to provide a sealing device which can reduce friction caused by a seal lip of a piston member to thereby improve the workability of the piston member.

The sealing device according to the present invention comprises a housing provided with an annular piston insert hole, an annular piston member slidably inserted into the piston insert hole of the housing, and a seal lip provided in inner and outer peripheries of the piston member and on slidably sealing contact with the inner and outer peripheral surfaces of the piston insert hole, the sliding surface of the seal lip being provided with rugged portions.

The rugged portions of the sliding surface of the seal lip comprise parallel projections or parallel grooves provided on the circumference, and preferably, the height of the projection or the depth of the groove is 0.05 to 0.2 mm.

In the sealing device constructed as described above, the sliding surface of the seal lips provided on the inner and outer peripheries of the piston member in slidably sealing contact with the inner and outer peripheral surfaces of the piston insert hole is provided with the rugged portions (for example, the parallel projections or parallel grooves). Therefore, the contact area with the peripheral surface of the mating piston insert hole becomes small, and fluids on the sealing object side are present in the rugged portions.

For this reason, the friction is lowered, and the friction caused by the seal lip can be reduced. With this, the sliding of the piston member is carried out under the low friction, thus improving the workability of the piston member.

The optimal shape for providing the most stabilized low friction caused by the seal lip is that the rugged portions on the sliding surface of the seal lip are provided on the circumference as the parallel projections or parallel grooves according to the experiment, the height of the parallel projection or the depth of the parallel groove being 0.05 to 0.2 mm.

This is because of the fact that when the height of the projection or the depth of the groove is made large, the unevenness of the frictional force increases, and when making small in an attempt of suppressing the unevenness, the frictional force increases. The aforementioned dimension is set as a proper value at which the unevenness becomes small with the low frictional force.

With this, the friction can be further reduced, and the workability of the piston member can be further improved.

DESCRIPTION OF THE EMBODIMENTS

The illustrated embodiment of the present invention will be described hereinafter with reference to the drawings.

Figure 1A:
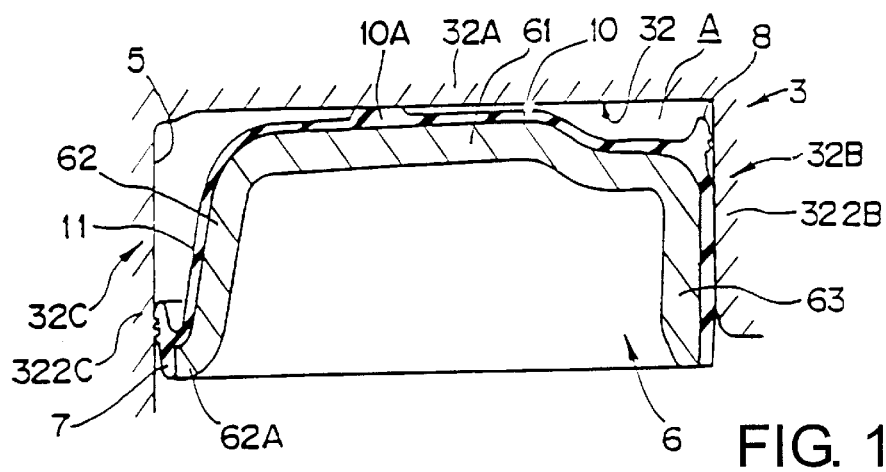
FIG. 1(a) is a sectional view of a sealing device according to one embodiment of the present invention.
Figures 1B, 1C:
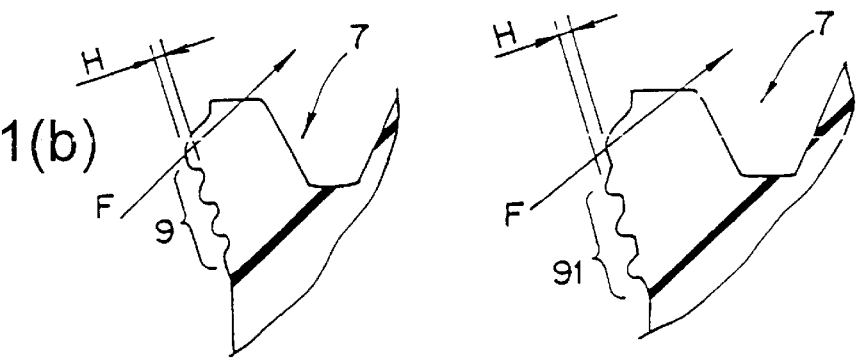
FIG. 1(b) is an enlarged sectional view of main parts showing a parallel groove of an inner peripheral seal lip.
FIG. 1(c) is an enlarged sectional view of main parts showing a parallel projection of an inner peripheral seal lip.
Figure 2:
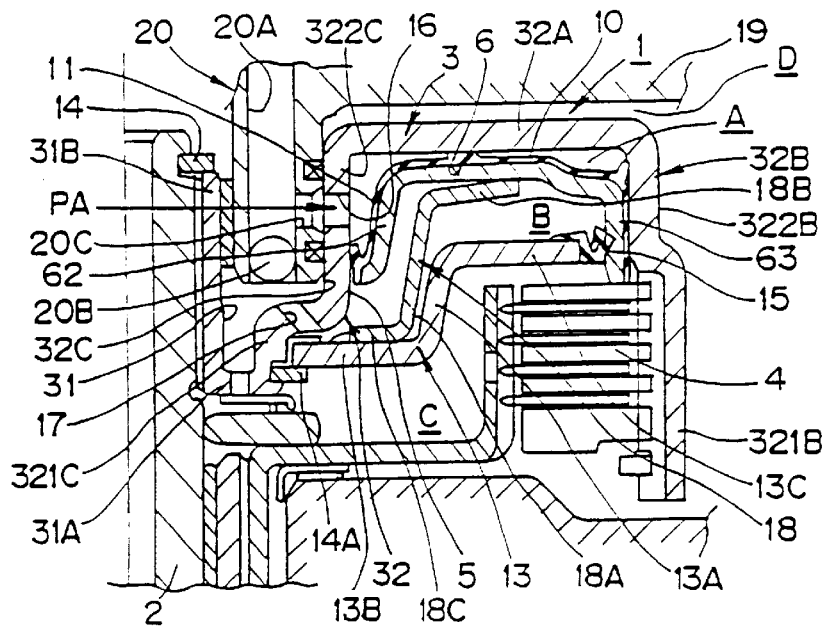
FIG. 2 is a sectional view showing a piston portion of an automatic transmission for which the sealing device shown in FIG. 1 is used.

The sealing device according to one embodiment is shown in FIGS. 1 and 2. A sealing device 1 according to the present embodiment is used for a piston portion of an automatic transmission (A/T, CVT, T/F) of an automobile or the like similar to the prior art, as shown in FIG. 2.

That is, schematically, the sealing apparatus 1 is provided with a seal lip on inner and outer peripheries of an annular piston member relating to an input of a speed-change switching in an automatic transmission (A/T, CVT, T/F) of an automobile, for example, mainly, a piston which has a function to receive oil pressure to cause it to input and transmit to the clutch.

In the figure, reference numeral 2 designates a sleeve. The sleeve 2 is mounted on a rotational shaft not shown. The sleeve 2 is provided on the outer peripheral side thereof with a retaining ring 3 forming a housing.

The retaining ring 3 has a substantially S-shaped section, and has a first annular concave portion 31 opened to an axial outside (upper side in the figure) and a second annular concave portion 32 opened to an axial inside (lower side in the figure). An axial outer end of an inner peripheral cylindrical portion 31B of the first annular concave portion 31 is mounted on the sleeve 2 while controlling axial movement thereof by means of a stopper 14.

The second annular concave portion 32 comprises a diametral portion 32A, an outer peripheral cylindrical portion 32B, and an inner peripheral cylindrical portion 32C (the outer peripheral cylindrical portion of the first annular concave portion 31). The outer peripheral cylindrical portion 32B extends axially inside from a diametral portion 31A of the first annular concave portion 31.

The outer peripheral cylindrical portion 32B is provided with a shoulder, and the axial inside thereof is positioned on the outer peripheral side having a large diameter. The inner peripheral cylindrical portion 32C is also provided with a shoulder, and the diametral portion 31A of the first annular concave portion 31 is positioned on the inner peripheral side having a small diameter.

The boundary between a large diametral portion 321B on the axial inner side of the outer peripheral cylindrical portion 32B and a small diametral portion 322B is close to the axial outer side of a small diametral portion 321C of the inner peripheral cylindrical portion 32C, and the large diametral portion 321B is longer than the small diametral portion 322B on the axial outer side. A multiple-disc clutch 4 is received on the inner peripheral side of the aforementioned long large diametral portion 321B.

On the other hand, on the side of a small diameter portion 322B of the outer peripheral cylindrical portion 32B of the second annular concave portion 32, an annular piston insert hole 5 is formed by a small diametral portion 322B thereof, the diametral portion 32A and a large diametral portion 322C of the inner peripheral cylindrical portion 32C.

The annular piston member 6 is axially slidably inserted into the annular piston insert hole 5.

The piston member 6 is a metal ring having a substantially U-shaped section comprising a washer-like end wall 61 facing to the end of the diametral portion 32A of the second annular concave portion 32 of the retaining ring 3, and a pair of inner peripheral and outer peripheral skirt portions 62, 63 extending toward a multiple-disc clutch 4 axially from the inner and outer diametral ends of the end wall 61. The outer peripheral side of the end wall 61 (outer peripheral skirt portion 63 side) is deviated on the multi-plate clutch 4 side.

The inner peripheral skirt portion 62 is provided at its extreme end with an inward flange portion 62A which slightly extends radially inwardly, and an inner peripheral seal lip 7 made from a rubber-like elastic element is integrally baked and secured to the inner diametral end of the inward flange portion 62A.

The inner peripheral seal lip 7 extends toward the diametral portion 32A of the axial second annular concave portion 32 and is inclined to be opened radially inwardly, and the extreme end of the lip is slidably placed in sealing contact with the outer peripheral surface of the piston insert hole 5 (outer peripheral surface of the large diametral portion 322C of the inner peripheral cylindrical portion 32C).

Further, an outer peripheral seal lip 8 made from a rubber-like elastic element is integrally baked and secured to a comer portion between the outer peripheral skirt portion 63 and the end wall 61.

The outer peripheral seal lip 8 extends toward the diametral portion 32A of the axial second annular concave portion 32 and is inclined to be opened radially inwardly, and the extreme end of the lip is slidably placed in sealing contact with the outer peripheral surface of the piston insert hole 5 (inner peripheral surface of the small diametral portion 322B of the outer peripheral cylindrical portion 32B).

In this manner, a pressure chamber A is formed between the piston member 6 and the diametral portion 32A of the second annular concave portion 32 of the retaining ring 3 through the inner peripheral seal lip 7 and the outer peripheral seal lip 8.

The sliding surfaces of the inner peripheral seal lip 7 and the outer peripheral seal lip 8 are provided, as ruggedness on the circumference, with a parallel groove 9 as a side-by-side groove (see FIG. 1(b); since the sliding surfaces for both inner peripheral seal lip 7 and outer peripheral seal lip 8 are the same in shape, only the inner peripheral seal lip 7 is disclosed) or a parallel projection 91 as a side-by-side projection (see FIG. 1(c); since the sliding surfaces for both inner peripheral seal lip 7 and outer peripheral seal lip 8 are the same in shape, similarly to the parallel groove 9, only the inner peripheral seal lip 7 is disclosed).

The inner and outer peripheral lips 7 and 8 may be formed by molding as shown in FIGS. 1 (b) and (c) or may be formed by messcut in arrow F in the figure (only the inner peripheral seal lip 7 is shown).

The end surface of the end wall 61, the inner peripheral surface of the inner peripheral skirt portion 62 and the outer peripheral surface of the outer peripheral skirt portion 63 are wholly coated by end surface, inner peripheral and outer peripheral coatings 10, 11 and 12 formed of rubber-like elastic material, the inner peripheral seal lip 7 and the outer peripheral seal lip 8 being formed integral with the end surface, inner peripheral and outer peripheral coatings 10, 11 and 12.

The end surface coating 10 is provided with a convex portion 10A for locating the piston member 6 by contact with the end surface of the diametral portion 32A of the second annular concave portion 32 as a deep end surface of the piston insert hole 5.

On the multiple-disc clutch 4 side of the second annular concave portion 32 opposed to the piston member 6 is provided a cancel plate 13 as an annular control member by which an axial movement is controlled. The cancel plate 13 is a metal ring formed from a thin steel plate and is set to the inside diameter detachable with respect to the small diameter portion 321C of the inner peripheral cylindrical portion 32C of the second annular concave portion 32 to control axial movement, more specifically, movement in a direction away from the piston member 6 by means of a stopper 14A The outside diameter of the cancel plate 13 is smaller than the inside diameter of the outer peripheral skirt portion 63 of the piston member 6.

That is, the cancel plate 13 is a metal ring extending from the small diameter portion 321C of the inner peripheral cylindrical portion 32C of the radial second annular concave portion 32 to the outer peripheral skirt portion 63 of the piston member 6 and has a cylindrical portion 13A in the midst in a radial direction thereof, the cancel plate 13 having an inward flange portion 13B extending from the end on the multiple-disc clutch 4 side of the cylindrical portion 13A to the small diameter portion 321C and an outward flange portion 13C extending from the other end on the piston member 6 side to the outer peripheral skirt portion 63, and an oil seal 15 as a seal member in slidably sealing contact with the inner peripheral surface of the outer peripheral skirt portion 63 of the piston member 6 is provided at the outer diameter end thereof.

In this manner, an oil chamber B is formed between the cancel plate 13 and the piston member 6, which is separated from an oil chamber C on the multiple-disc clutch 4 side.

The large diameter portion 322C of the inner peripheral cylindrical portion 32C of the second annular concave portion 32 of the retaining ring 3 is provided with a passage 16 in communication with the pressure chamber A, the small diameter portion 321 thereof being provided with a passage 17 in communication with the oil chamber B.

Between the cancel plate 13 and the piston member 6 is provided a spring 18 as a bias means for biasing the piston member 6 in a direction away from the cancel plate 13, that is, upward in FIG. 2.

This spring 18 is plate-like and comprises a cylindrical portion 18 slightly inclined externally in a radial direction, an outward flange portion 18B extending outward in a radial direction from the end of the piston member 6 of the cylindrical portion 18A, and an inward flange portion 18C extending inward in a radial direction from the end of the cancel plate 13.

The end of the inward flange portion 18C comes in contact with the end of the inward flange portion 13B of the cancel plate 13, and the outer diametral end of the inclined outward flange portion 18B comes in contact with the end wall 61 of the piston member 6 to bias the piston member 6 in a direction away from the cancel plate 13.

A port portion 20 in a housing 19 on the mating side as a mating mounting portion forming a mounting space D of an automobile or the like on which the sealing device 1 is mounted is fluid-tightly inserted into the first annular concave portion 31 of the retaining ring 3.

The port portion 20 has a port 20A in communication with the exterior and the interior of the first annular concave portion 31 but the open end thereof is closed by a spherical body 20B. The port 20A has a communication path 20C in communication with the passage 16 of the retaining ring 3 so that working pressure PA is supplied from the exterior to the pressure chamber A.

With the above-described constitution, since the piston member 6 and the cancel plate 13 are mounted on the sleeve 2 through the retaining ring 3, they are rotated (about 0 to 8000 rpm) together with the unit by the rotation of a rotational shaft on which is mounted the sleeve 2.

When oil is supplied to the oil chamber B through the passage 17 of the retaining ring 3 and the pressure chamber A lowers in pressure, the biasing force of the spring 18 is applied to the piston member 6, and the concave portion 10A of the end surface coating 10 comes in contact with the diametral portion 32A of the second annular concave portion 32 of the retaining ring 3 of the retaining ring 3 and stands still.

The working pressure PA (about 5 to 30 kgf/cm2) exerts on the pressure chamber A through the port 20A of the port portion 20 of the mating housing 19, the communication path 20C and the passage 16 of the retaining ring 3. When pressure rises, the piston member 6 moves downward in FIG. 2 against the biasing force of the spring 18 to press the multiple-disc clutch 4 at the end of the outer peripheral skirt portion 63 of the piston member 6, and to transmit power.

When the transmission of power is released, oil is supplied to the oil chamber B as described above to lower the pressure of the pressure chamber A whereby the piston member 6 is moved upward in FIG. 2 by the biasing force of the spring 18. Thereby, it returns to the original position.

In the sealing device constructed as described above, since the parallel groove 9 or the parallel projection 91 as ruggedness is provided on the sliding surfaces of the inner peripheral seal lip 7 an the outer peripheral seal lip 8 provided on the inner and outer peripheries of the piston member 6 in slidably sealing contact with the inner and outer peripheral surfaces of the piston insert hole 5, the substantial contact area with the peripheral surface of the mating piston insert hole 5 is small and the oil as a fluid on the sealing object side is present in the concave portion.

Therefore, there results in the low friction, and the friction caused by the inner and outer peripheral seal lips 7 and 8 is reduced. As a result, since the sliding of the piston member 6 is effected under low friction, the workability of the piston member 6 can be improved.

Thereby, there occurs no inconveniences of speed change of an automatic transmission, for example, such as a great shock at the time of speed change, and deterioration of feeling at the time of speed change, enabling the enhancement of function.

Further, since the friction will not be large, it is not necessary to change the mechanism.

That is, it is not necessary to increase the force of the spring 18 as biasing means for returning the piston member 6, it is not necessary to change the particulars of the spring 18.

Thereby, the cost is not increased with the change of the particulars of the spring as in prior art, the entire apparatus need not be changed, and the apparatus is incorporated without fail in the mounting space D of the automobile as the mating mounting portion.

Figure 3:
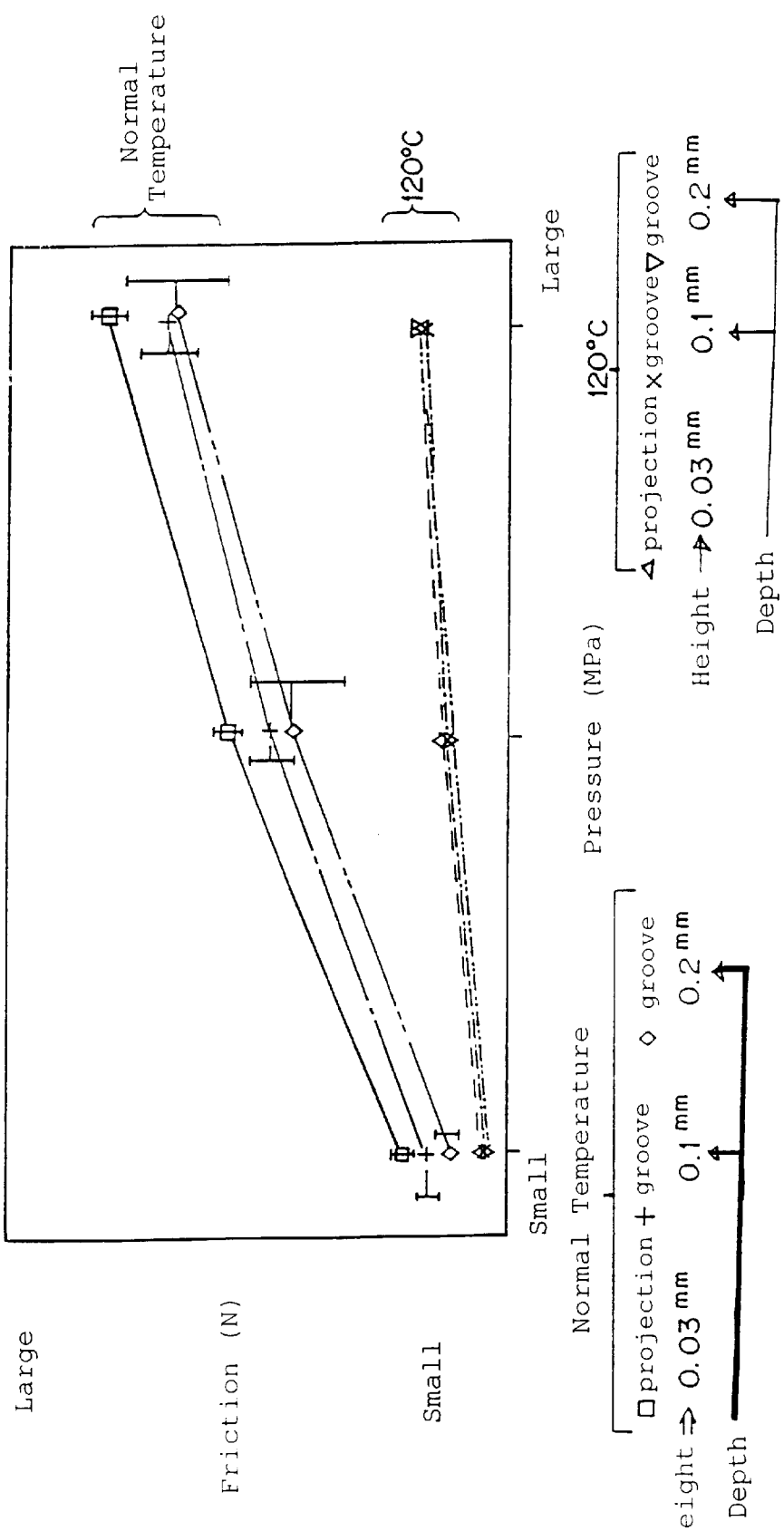
FIG. 3 is a graph showing a relationship between pressure and frictional force in the height of depth of a parallel projection or a parallel groove in the sealing device shown in FIG. 1.
Figure 4:
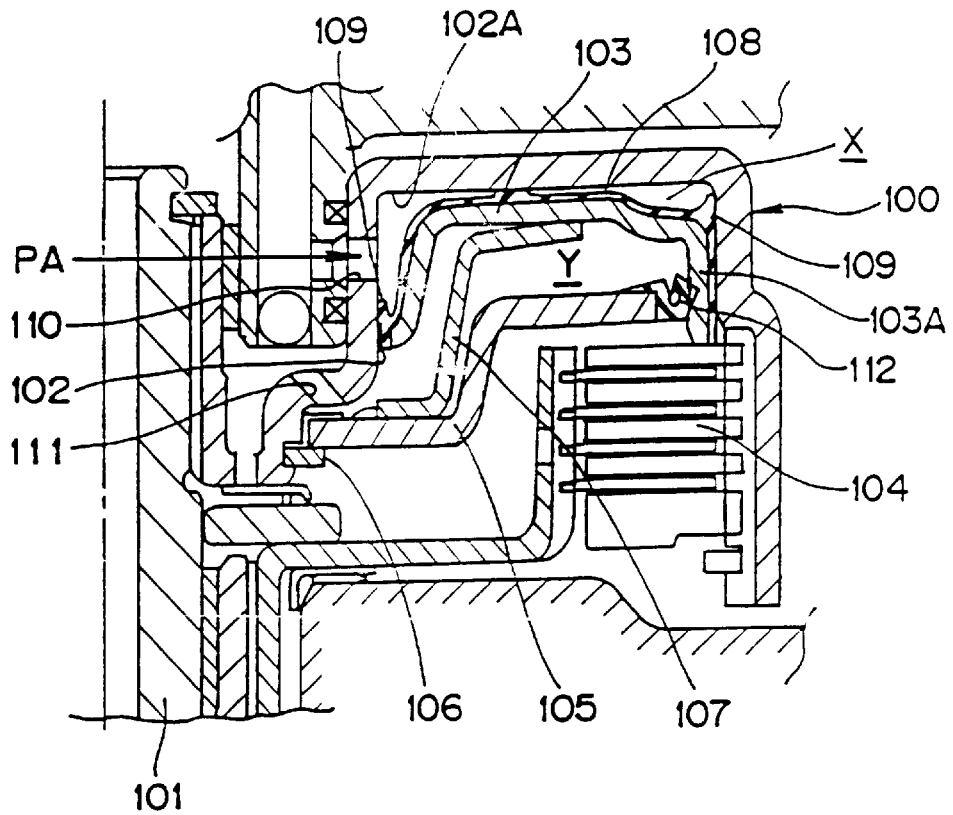
FIG. 4 is a sectional view of a piston portion of an automatic transmission using a conventional sealing device.
Figure 5A:
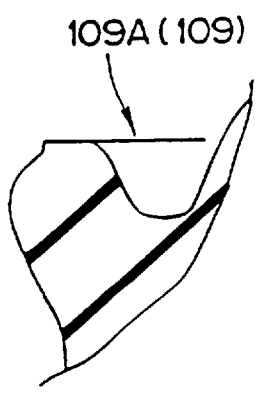
FIGS. 5 (a) and 5 (b) are respectively enlarged sectional views of main parts of a seal lip of the conventional sealing device.
Figure 5A:
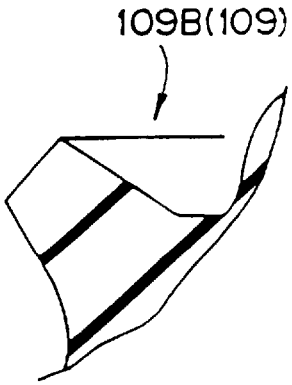

With respect to the dimension of the height or depth H of the parallel projection 91 or the parallel groove 9 provided on the sliding surfaces of the inner and outer peripheral seal lips 7 and 8 (see FIGS. 1 (b) and (c)), the relationship between the friction (N) and pressure (MPa) at normal temperature and at 120° C. was examined, the result of which is shown in the graph of FIG. 3.

The height or depth H was experimented with a small projection (0.03 mm), a middle groove (0.1 mm) and a large groove (0.2 mm).

It is found from the graph that at normal temperature, the frictional force is in order of (high) small projection>middle groove>large groove (low). When the height or depth H is large, the frictional force is small but irregularity is large. Therefore, preferably, the dimension of the height or depth H is 0.05 to 0.2 mm.

On the other hand, at a temperature of 120° C., there is rarely a difference in frictional force and irregularity.

While in the above-described embodiment, a description has been made of an example of apparatus used for a piston portion of an automatic transmission of an automobile or the like, it is to be noted that it can be used for a piston portion of other mechanisms.

Materials and shapes of the constituent parts shown in the above-described embodiment can be suitably changed according to the particulars.

In the present invention, since the ruggedness are provided in the sliding surfaces of the seal lips provided on the inner and outer peripheries of the piston member in slidably sealing contact with the inner and outer peripheral surfaces of the piston insert hole, the contact area with the peripheral surface of the mating piston insert hole, and the fluid on the sealing object side is present in the concave portion.

For this reason, there results in the low friction, and the friction caused by the seal lip can be reduced. With this, since the sliding of the piston member is effected under low friction, the workability of the piston member can be improved.

The optimal shape to provide most stabilized and low friction caused by the seal lip is that according to the experiment, the ruggedness of the sliding surface of the seal lips are provided as the parallel projection or parallel groove. Preferably, the height of the projection or the depth of the groove is 0.05 to 0.2 mm. By employment of this dimension, the friction can be further reduced, and the workability of the piston member can be improved.

It is most important in the present invention to retain a predetermined oil pressure.

Particularly, when the sealing apparatus of the present invention is used for the automatic transmission for the automobile, a predetermined oil pressure is retained in the state where the entire unit rotates together. The multiple-disc clutch is depressed to perform transmission. When rotated, a small centrifugal oil pressure exerts on the inner peripheral side, and a large centrifugal oil pressure exerts on the outer peripheral side. Even under this state, good oil pressure retaining must be achieved.

By setting the depth of the groove to 0.05 to 0.2 mm, much oil can be put into the groove to increase an oil film. As a result, the oil pressure retaining is further improved. When less than 0.05 mm, the better oil film is hard to obtain. When larger than 0.2 mm, the irregularity of oil pressure increases.

In the present invention, as long as a predetermined oil pressure can be retained, some oil leakage can be allowed. Therefore, the shape of the extreme end (contact portion) of the projection or groove is rounded to enable the smooth piston motion.

What is claimed is:

1. A sealing apparatus comprising:
   a housing having an annular piston insert hole which includes an inner peripheral cylindrical surface and an outer cylindrical peripheral surface thereof;
   a piston member having an annular portion which is slidably inserted into the piston insert hole, the annular portion including an inner peripheral portion and an outer peripheral portion thereof;
   an inner seal lip fixed at the inner peripheral portion of the piston member, the inner seal lip having a sealing portion which is slidably placed in contact with the inner peripheral cylindrical surface of the annular piston insert hole;
   an outer seal lip fixed at the outer peripheral portion of the piston member, the outer seal lip having a sealing portion which is slidably placed in contact with the outer peripheral cylindrical surface of the annular piston insert hole;
   the sealing portion of both the inner seal lip and the outer seal lip having a rugged portion formed by a plurality of grooves which are arranged in an annular direction in parallel relation to each other and have a depth of 0.05 mm to 0.2 mm; and
   a pressure chamber and an oil chamber separated by the piston member within the piston insert hole of the housing, both the pressure chamber and the oil chamber being filled with oil;
   the sealing portion of the inner seal lip including said plurality of grooves each having a rounded-shape contact surface allowing hydrodynamic oil flow into said grooves so that some oil leakage does occur from the pressure chamber into the oil chamber via the inner seal lip.

2. A sealing apparatus as defined in claim 1, wherein the housing is formed as a retaining ring through which the piston member is mounted to a sleeve in such a manner that all of them rotate at 0 to 8,000 rpm as a unit.

3. A sealing apparatus as defined in claim 1, wherein the housing, the piston member, the inner seal lip and the outer seal lip define the pressure chamber therein into which working pressure is applied.

4. A sealing apparatus as defined in claim 1, wherein the sealing apparatus is used in an automatic transmission for an automotive vehicle.

* * * * *